United States Patent Office 3,371,477
Patented Mar. 5, 1968

3,371,477
MANUFACTURE OF TEXTILE PRODUCTS IN THE FORM OF THREADS, CORDS, ROPES AND OTHER SIMILAR ARTICLES FROM FILMS OF ORIENTED SYNTHETIC LINEAR POLYMERIC MATERIAL
Pierre Felix, Miribel, France, assignor to Societe Rhodiaceta, Paris, France, a French body corporate
No Drawing. Filed Feb. 1, 1966, Ser. No. 523,914
Claims priority, application France, Feb. 12, 1965, 5,397
10 Claims. (Cl. 57—157)

This invention relates to the manufacture of textile products in the form of threads, cords, ropes or other similar articles from films of oriented synthetic linear polymeric material.

It has long been known to prepare such textile products from films of oriented polymeric material.

It was first proposed to produce narrow strips from linear polycondensates, for example polyamides, and to twist these strips and to orient them by stretching during or after the twisting. The products so obtained have not been very satisfactory.

To obtain a strong, flexible product, it has been proposed to stretch in the longitudinal direction, preferably at an elevated temperature, a film or ribbon of orientable synthetic linear polymeric material, to subject this film, during or after the stretching, to fibrillation—the fibrillation of a film is easier the higher its degree of orientation—and then to convert the fibrillated film into a textile product of the aforesaid type by twisting. The products obtained are generally satisfactory for many applications.

Various methods of effecting the fibrillation of the stretched film are already known. For example, two brushes, preferably of metal, may be disposed one on each side of a stretched film, one being fixed and the other rotatable. This brushing exerts an intense mechanical action which often produces shredding of the film, and results, on the one hand, in the presence of broken fibres on the finished product, and on the other hand, in a reduction of the dynamometric characteristics of the material.

It has recently been proposed to effect the fibrillation with the aid of vibratory waves produced by acoustic or electrostatic means, or by means of a fluid having irregular turbulence, which means may, where necessary, be associated with a mechanical action. However, these methods, which may be suitable for the manufacture of fibrous materials for use in making non-woven materials, are difficult to apply and necessitate costly apparatus.

In the process of the present invention a film of oriented synthetic linear polymeric material is fibrillated before it is twisted.

More particularly, the invention comprises a process for the manufacture of textile products in the form of threads, ropes, cords or other similar articles by fibrillating a film of oriented synthetic linear polymeric material and twisting, or twisting together, one or more of the resulting fibrillated films, wherein the stretched film is fibrillated by vigorously projecting onto it while it is held spread out and under tension, at least one jet of fine solid particles.

By means of the invention, which is easy to carry out, there can readily be produced textile products such as cords which are satisfactory for many applications, as a result notably of their flexibility and excellent dynamometric characteristics.

The process is applicable to all film-forming polymers which are orientable by stretching. The many polymers which may be employed include polyolefines (polyethylene, polypropylene etc.), polymers and copolymers of acrylonitrile, polyvinyl chloride and its derivatives, polyamides (e.g. types 6, 6—6, 6-10, 11 etc.) and copolyamides, polyesters (e.g. ethylene polyterephthalate) and copolyesters, and other products.

In carrying out the invention, the polymer may be formed by any method into a film, which is then longitudinally stretched, preferably in such a manner as to reach the maximum ease of fibrillation, that is to say, to the highest practicable degree. This stretching can be facilitated by operating at elevated temperature or by any other conventional means. After the stretching the film is preferably not more than 0.3 mm., and especially between 0.01 and 0.15 mm., thick.

The projection of the fine solid particles onto the film can be carried out using various broadly equivalent means.

A particularly satisfactory means is that known in the mechanical field as a "sandblasting machine," which is currently employed for cleaning and polishing metal parts. Such machines are too well known to need description here.

As solid particles, there are advantageously employed those which are in current use in the mechanical field, for example angular sand grains, notably of flint, which have sharp edges and whose dimensions are between 0.1 and 2 mm. There may also be employed shot, generally steel shot, of substantially the same size and form as sand grains.

The solid particles may be vigorously projected onto the film by means of any appropriate apparatus, notably of the compressed-air type. Preferably, the direction of the jet of particles is perpendicular or nearly perpendicular (say between 80° and 100°) to the plane of the film in the zone of impact.

The process of the invention differs functionally from earlier processes utilising fluid, for example turbulent fluid, in that the fluid (e.g. compressed air) does not itself produce the fibrillation, but serves as a support or carrying medium for the solid particles which, by a simple mechanical action, produce incipient rupture and hence the fibrillation.

The fibrillation operation is preferably carried out at the ambient temperature and on film which is at least initially at the ambient temperature.

When the films have been fibrillated, the products are twisted by any appropriate means, optionally after superimposition of a number of films, and if necessary a heat treatment or another similar setting treatment is applied to the twisted yarn obtained.

The products of the invention may be used as or converted into threads, ropes, cords or other similar articles. They have proved particularly useful in the twine field, e.g. in twines for wrapping, and twines for agricultural machines (binding twines, bundling twines).

The following example illustrates the invention.

*Example*

A film of isotactic polypropylene is formed by extrusion and is stretched at elevated temperature by about six times its original length, after which it is cut into strips 12 mm. wide and about 0.04 mm. thick.

These strips are passed, while spread out and maintained under a tension of about 500 g., at a speed of 25 metres per minute through a suction type sandblasting machine having a nozzle of diameter 8 mm., using an air pressure of 4 kg./cm.$^2$ and a sand grain size of 25–16 (25–16 meshes/cm.$^2$) and a nozzle to film distance of 30 mm.

A number of fibrillated strips are then assembled, twisted together with 35 turns per metre, and then treated for 5 minutes with steam in an oven at 100° C.

The products obtained possess the following characteristics:

| Number of fibrillated strips | Diameter of the twine in mm. | Total denier | Number of m./kg. | Breaking strength in kg. | Elongation at rupture (percent) | Loss of breaking strength on knotting |
|---|---|---|---|---|---|---|
| 3 | 2.9 | 17,400 | 517 | 45.6 | 21.6 | 7.9 |
| 6 | 3.9 | 30,000 | 300 | 81 | 20.3 | 9 |

I claim:
1. A process for the manufacture of textile products in the form of threads, ropes, cords and like articles, which comprises fibrillating an oriented film of a linear synthetic polymeric material by vigorously projecting onto the film, while it is stretched out and under tension, at least one jet of fine solid particles, and twisting the resulting fibrillated film.
2. A process according to claim 1, wherein a plurality of fibrillated films are twisted together.
3. A process according to claim 1, wherein the solid particles are projected by means of a compressed fluid.
4. A process according to claim 1, wherein the stretched out film is sandblasted.
5. A process according to claim 1, wherein the oriented film is less than 0.3 mm. thick.
6. A process according to claim 1, wherein the film is 0.01 to 0.15 mm. thick.
7. A process according to claim 1, wherein the polymeric material is a polyolefine.
8. A process according to claim 1, wherein the polymeric material is an isotactic polypropylene.
9. A process according to claim 1, wherein the twisted filamentary product is heat set.
10. A process according to claim 9, wherein the said product is heat set by means of steam.

References Cited

UNITED STATES PATENTS

| | | |
|---|---|---|
| 2,582,327 | 1/1952 | Woodbridge. |
| 2,675,312 | 4/1954 | Lammers. |
| 3,003,304 | 10/1961 | Rasmussen _____ 57—157 |
| 3,136,649 | 6/1964 | Keahey _____ 83—53 XR |
| 3,168,802 | 2/1965 | Linke et al. |
| 3,177,557 | 4/1965 | White. |
| 3,227,019 | 1/1966 | Schur _____ 83—177 XR |

FRANK J. COHEN, *Primary Examiner.*

DONALD WATKINS, *Assistant Examiner.*